Patented July 5, 1938

2,122,719

UNITED STATES PATENT OFFICE 2,122,719.

ETHYNYLHYDROXYCARBOXYLIC ACIDS, LACTONES THEREOF AND PROCESS OF PREPARING THEM

Oscar Robert Kreimeier, Woodstown, N. J., assignor to E. I. du Pont de Nemours & Company, Wilmington, Del., a corporation of Delaware No Drawing. Application July 20, 1936, Serial No. 91,625

27 Claims. (Cl. 260—123)

This invention relates to ethynyl-substituted hydroxycarboxylic acids and ethynyl-substituted lactones, and to a process for preparing them. More particularly, it relates to ethynyl-substituted hydroxycarboxylic acids and ethynyl-substituted lactones prepared by reacting keto-acids with very soluble and reactive forms of alkali metal acetylides in solution in liquid ammonia.

This invention has as an object the preparation of ethynyl-substituted hydroxycarboxylic acids. A further object is the preparation of ethynyl-substituted lactones. A still further object is the provision of new compounds, i. e., ethynyl-substituted hydroxycarboxylic acids and ethynyl-substituted lactones. A still further object is the preparation of compounds useful as solvents and plasticizers for cellulose derivatives, synthetic resins, etc., as alcohol denaturants, as insecticides, and, in the form of metal derivatives, as anti-knock compounds and as fungicides. Other objects will appear hereinafter.

These objects are accomplished by the following invention which comprises reacting an alkali metal with an excess of liquid ammonia in the presence of an alkali metal oxide and of an ammonia-soluble hydrated salt of a ferrous metal, reacting the solution of alkali metal amide thus formed with acetylene or an equivalent hydrocarbon, and finally reacting the resulting alkali metal acetylide in situ with a keto acid wherein the carbonyl and carboxyl groups are separated by at least one carbon atom. All three steps are carried out in liquid ammonia as one continuous process. Sodium is a typical alkali metal, sodium oxide a suitable alkali metal oxide, ferric nitrate enneahydrate a typical hydrated ferrous metal salt, and levulinic acid a typical keto acid suitable for practicing the present invention.

The invention described herein is based upon the discovery that ethynyl-substituted lactones and ethynyl-substituted hydroxycarboxylic acids can be obtained in good yields and in a high state of purity by reacting keto acids, in which the carbonyl and carboxyl groups are separated by at least one carbon atom, with a reactive and soluble form of sodium or other alkali metal acetylide which is in turn prepared from a reactive and soluble variety of sodium or other alkali metal amide. The preparation of this sodamide, which forms the first step of the present invention, is described by Vaughn, Vogt, and Nieuwland (J. Am. Chem. Soc. 56, 2120) and consists in reacting sodium with excess liquid ammonia in the presence of catalytic proportions of alkali metal oxides and of ammonia-soluble hydrated ferrous metal (i. e., iron, cobalt or nickel) salts. The second step of the present invention, also mentioned by Vaughn, Vogt, and Nieuwland, is to react the alkali metal amide in situ (i. e., without isolating it from the liquid ammonia in which it is formed) with acetylene or an equivalent hydrocarbon to form an alkali metal acetylide of a variety which is particularly reactive. The third and final step of the present invention, which is also new in itself, is to react the alkali metal acetylide in situ with the selected keto-acid. In this last step, the reaction is usually complete in about four hours. The ammonia is then evaporated off, the residue is treated with water, and the resulting solution or suspension is acidified to liberate the ethynyl-substituted lactone or the ethynyl-substituted hydroxycarboxylic acid, which is subsequently purified by conventional means.

The catalysts used in the first step of the process are especially active and in the presence of excess liquid ammonia rapidly convert the alkali metal to the alkali metal amide. In the absence of these catalysts the alkali metal reacts only slowly with liquid ammonia to form the alkali metal amide. After the latter is formed the solution may, if desired, be freed of any suspended catalyst by diluting it with liquid ammonia to about twice its volume and filtering. The alkali metal amide obtained by the catalytic method under discussion is more reactive and more soluble in liquid ammonia than is the corresponding alkali metal amide prepared by other previously known methods. In order that it retain these properties to the greatest degree, it should be reacted with the acetylenic hydrocarbon in the liquid ammonia in which it is formed, instead of being isolated therefrom.

The products of this invention are ethynyl-substituted hydroxycarboxylic acids or ethynyl-substituted lactones, depending upon the keto-acids employed. It may be considered that ethynyl-substituted hydroxycarboxylic acids are first formed in any case, with the subsequent formation of lactones in the case of those hydroxy acids which are susceptible to lactone formation. When the acids produced are not of the type which form lactones, they are obtained as ethynyl-substituted hydroxycarboxylic acids. Beta-keto-acids and keto-acids in which the carbonyl group is far removed from the carboxyl group, for example, give rise to ethynyl-substituted hydroxycarboxylic acids which do not form lactones. On the other hand, gamma- and delta-keto-acids form ethynyl-substituted gammaand delta-hydroxycarboxylic acids which may, under the conditions of the process described herein, form lactones. If the reaction mixtures containing ethynyl-substituted beta-hydroxycarboxylic acids are subjected to prolonged heating or to relatively high temperatures, these acids may form ethynyl-substituted acrylic acids.

The probable reactions between sodium acetylide and keto-acids may be represented thus:

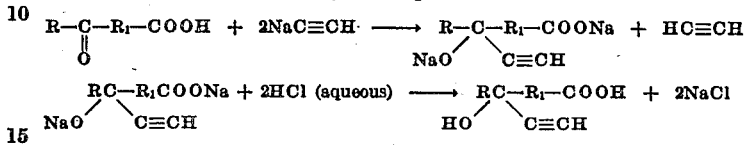

(where R may be a monovalent hydrocarbon group such as methyl, ethyl, phenyl, etc., and where $R_1$ may be a divalent hydrocarbon group such as phenylene, methylene ($—CH_2—$), ethylene, etc.) The hydroxy acids described herein, as is evident from the above formulas, all contain the group

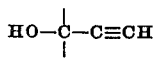

Having thus outlined the objects and principles of the invention, the following example is added in illustration and not in limitation.

*Preparation of gamma-ethynyl-gamma-valerolactone*

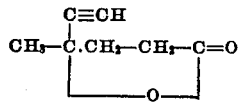

One part of sodium was added to a mechanically stirred mixture of 0.3 part of finely powdered ferric nitrate enneahydrate ($Fe(NO_3)_3.9H_2O$) in 400 parts of liquid ammonia, contained in a reaction vessel of approximately four times the volume of these reactants. Air was bubbled through the solution until the blue color was discharged (to form oxides of sodium in the reaction mixture), and 46 parts (2 mols) of sodium was then added in small pieces. The reaction set in at once and in 10–20 minutes the blue color changed to gray, indicating the end of the conversion.

Acetylene gas was purified by passing it successively through 10% sulfuric acid, through 10% sodium hydroxide, through a trap cooled in a methanol-solid carbon dioxide bath, and finally through calcium chloride towers. From the calcium chloride towers it was passed rapidly into the liquid ammonia solution of sodamide prepared as described above, the temperature of the reaction mixture being maintained at about $-50°$ C. The color of the solution changed from gray to black, which indicated that sodamide had completely reacted with acetylene to form sodium acetylide.

To the solution of sodium acetylide in liquid ammonia prepared as described above was added 116 parts (1 mol.) of levulinic acid. The reaction mixture was stirred for about 4 hours, the temperature being maintained at about $-50$ to $-40°$ C. The ammonia was then allowed to evaporate at room temperature, and the residue was dissolved in water and acidified with sulfuric acid. The oily layer was separated and the aqueous layer extracted with ether. The extract and oil were combined and distilled. The gamma-ethynyl-gamma-hydroxyvaleric acid on distillation gave gamma-ethynyl-gamma-valerolactone which boiled at 108–109° C./21 mm. The yield was 100 parts or 80% of theory. The solubility of the product in potassium hydroxide solution and its insolubility in potassium bicarbonate solution indicated that it was a lactone. On analysis it was found to contain 68.0% carbon and 7.03% hydrogen, the calculated values for the lactone being respectively 67.8% and 6.45%. The saponification number was 452 as compared to a theoretical value of 453.

While in the above example, levulinic acid was used to exemplify the keto-acids, ketonic acids in general may be employed, among them the following: levulinic ($CH_3COCH_2CH_2COOH$), theta-ketostearic $(CH_3(CH_2)_8CO(CH_2)_7—COOH)$, gamma-ketostearic acid, licanic 4 keto-$\Delta$9, 11, 13-octadecatrienoic acid-C. A. 30 1598-), acetoacetic ($CH_3COCH_2COOH$), gamma-acetobutyric $(CH_3COCH_2—CH_2CH_2COOH)$, acetonedicarboxylic ($CO(CH_2COOH)_2$), diacetosuccinic

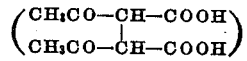

benzoylacetic ($C_6H_5COCH_2COOH$) and benzoylbenzoic ($C_6H_5COC_6H_4COOH$) acids. The compounds obtained from the above acids with the use of acetylene are respectively gamma-ethynyl-gamma - valerolactone, theta - ethynyl - theta - hydroxystearic acid, gamma - ethynyl - gamma - stearolactone, gamma-ethynyl-gamma-octadecatrienolactone, beta-ethynyl-beta-hydroxybutyric acid, delta - ethynyl - deltacaprolactone, beta - ethynyl-beta - hydroxy - gamma - carboxybutyric acid, 2,3-bis(-2 hydroxy-2 methylpropynyl-2) butanedioic acid, beta-ethynyl-beta-phenyl-beta-hydroxypropionic acid, and ethynyl-hydroxybenzyl-benzoic acid which in the case of the ortho-benzoyl-benzoic acid would be isolated as the phenyl-ethynyl-phthalide. Similarly other acetylenes would replace the ethynyl of the above compounds with the corresponding alkynyl group. The keto-acid may be monobasic or polybasic, saturated or unsaturated, and aliphatic or aromatic. If aromatic the ketone and acid groups may be in the same aliphatic chain or separated by an aromatic nucleus.

When free keto-acids are used in the process described herein, part of the alkali metal acetylide is consumed by them in forming their alkali metal salts. It is accordingly often more desirable to use the acids in the form of their salts in order to economize on the alkali metal acetylide.

Ketonic acids having a chain of at least two carbon atoms between the carbonyl and carboxyl groups are preferred and in particular those wherein the carbonyl and carboxyl groups are members of the same aliphatic chain. Beta keto-acids, because of their instability, are most conveniently employed as their esters, but the free acids may be employed at the low temperatures at which they are reacted in this invention.

While in the above example, sodium and sodium oxide were used, they may be replaced in whole or in part by other alkali metals such as lithium, potassium, rubidium, and caesium, and by their oxides. The oxide used need not be that of the metal reacted. Thus sodium may be reacted with ammonia which contains potassium oxide, or vice versa. Sodium oxide is, however, preferred. It has been found to be most convenient to use about 1 to 3%, based on the weight of the alkali metal, of the alkali metal oxide. The sodium or other alkali metal oxide is preferably formed in situ as in the example, since the addition of alkali metal oxide to the ammonia usually introduces alkali metal hydroxide which adversely affects the desired reaction. While ferric nitrate enneahydrate has been used to exemplify the second catalytic component, any ammonia-soluble hydrated salt of a ferrous metal, i. e., of iron, cobalt or nickel may be employed. Thus ferric nitrate hexahydrate, ferric bromide hexahydrate, hydrated ferric sulfate, hydrated ferric acetate, ferric chloride hexahydrate, and hydrated nitrates, nitrites, cyanides, and thiocyanates generally of iron, cobalt, and nickel may be employed. The hydrated ferric nitrates are preferred.

The acetylenic hydrocarbons suitable for use in the second step of the present invention may be represented comprehensively by the general formula $HC \equiv CR$, where R is hydrogen or a monovalent hydrocarbon radical. They may also be termed acetylenic hydrocarbons having at least one acetylenic hydrogen atom. The alkali metal acetylides which are formed and used in the third step of the invention have the comprehensive formula $MC \equiv CR$, where M is an alkali metal and R is hydrogen or a monovalent hydrocarbon radical. Examples of suitable specific acetylenes which may be used in the second step are acetylene, methylacetylene, ethylacetylene, n-butylacetylene, tert-butylacetylene, n-amylacetylene, isobutylacetylene, n-dodecylacetylene, n-hexylacetylene, n-nonylacetylene, n-decylacetylene, vinylacetylene, diacetylene, phenylacetylene, cyclohexylacetylene, etc. Acetylene is preferred. When the acetylenic compounds are liquids or solids, they may conveniently be added as such in the desired quantities to the liquid ammonia solution of alkali metal amide.

Where the keto-acid does not react readily with the alkali metal acetylide when added directly to the liquid ammonia solution thereof, it may be dissolved in a suitable solvent such as dry ether, hydrocarbons, pyridine, or liquid ammonia, before it is incorporated in the reaction mixture. This expedient, however, is not generally necessary or desirable.

The reaction mixtures are acidified in order to isolate the ethynyl-substituted lactones or the ethynyl-substituted hydroxycarboxylic acids. Any acid or acid-liberating agent can be used for this purpose. Ammonium chloride, for example, is a convenient means of neutralizing the reaction mixture. The products of this invention, particularly those which are not readily distillable, can sometimes be isolated from the reaction mixtures by extraction with suitable solvents such as ether, low-boiling hydrocarbons, etc.

The process is not limited to any particular proportions of reactants in any one of the three steps except that, in the first step, an excess of liquid ammonia must be used over that required to react with the alkali metal to form the alkali metal amide, and that in the second step there must be sufficient excess of liquid ammonia to dissolve the alkali metal acetylide as it is formed. These requirements are merely the necessary consequence of the use of liquid ammonia as a single, continuous solvent or reaction medium throughout all the steps of the process. The keto-acids and the alkali metal acetylides theoretically react mol. for mol. when the acid contains only one keto group. It is often convenient and desirable, however, to use less than the stoichiometric quantity of keto-acids, as illustrated in the example, particularly when the keto-acid is more expensive than the alkali metal acetylide. Use of excess alkali metal acetylide is particularly desirable when keto-acids are used which are volatile enough to be distilled out of the reaction mixture along with the lactone or hydroxy-acid which is the desired product, since excess alkali metal acetylide tends to drive the desired reactions to completion, thus reducing the amount of unreacted keto-acid to a minimum. The presence of excess alkali metal acetylide in the reaction mixture is not objectionable, since it is readily decomposed upon the addition of water or acids to form products which do not contaminate the lactone or hydroxy-acid upon distillation.

The time required in the third step for reacting the keto-acid with the alkali metal acetylide will vary with the temperature and the reactants, and may range from one to several hours. The reactions are usually substantially complete after about four hours but it may in many instances be extended with advantage to as much as fifteen hours or even longer, higher yields being obtained thereby. Moreover, with longer reaction periods the alkali metal may tend to act as a catalyst for the formation of the ethynyl-substituted lactones or ethynyl-substituted hydroxy acids described herein, when the keto-acids and acetylenic compounds are used in excess.

The reaction between the alkali metal and ammonia can be carried out conveniently at the boiling point of ammonia at ordinary pressure, i. e., at about $-33°$ C. By the use of pressure the reaction temperature may be raised, even up to the critical temperature of ammonia, i. e., $132°$ C. Temperatures lower than $-50°$ C. are not desirable due to the decreased speed of reaction. The remaining steps in the process may be carried out similarly. In general, temperatures of about $-50°$ C. to $-30°$ C. and atmospheric pressure are preferred throughout the entire process. As a rule, elevated pressures are advantageous only when it is desirable to operate at temperatures above the boiling point of ammonia.

The process described herein affords a simple, inexpensive method for preparing certain ethynyl-substituted lactones and ethynyl-substituted hydroxycarboxylic acids which are new compositions of matter. These lactones and hydroxy acids may be used for many purposes. The lactones, for example, may be hydrolyzed or saponified to the corresponding hydroxy acids. The beta-hydroxy acids may be dehydrated to beta-ethynyl acrylic acids. The lactones, the acids, and their esters, etc., may be used as solvents and plasticizers for natural or synthetic resins, cellulose derivatives, etc. They may also be used as alcohol denaturants and insecticides. Their metallic derivatives may be used as antiknock compounds and as fungicides. The lactones and hydroxy acids can also be reduced to the corresponding vinyl compounds. In some cases they can be hydrated to keto-lactones or to keto-hydroxy acids.

The process described herein involves no hazards from inflammable solvents such as ether or hydrocarbons and avoids the trouble and expense incidental to insolation of the alkali metal acetylides and their subsequent dispersion or solution in other reaction media. By virtue of the low temperatures used in the process, polymerization of reactants or the formation of undesirable by-products such as lactids, unsaturated acids, etc., is avoided.

In the specification and claims by ammonia is meant the compound NH₃ and not the solution thereof in water which is ammonium hydroxide. The term alkyl is used in the sense of a saturated aliphatic hydrocarbon radical. The term ferrous metal is used in the sense of a metal of the class consisting of iron, cobalt and nickel.

The above description and examples are intended to be illustrative only. Any modification of or variation therefrom which conforms to the spirit of the invention is intended to be included within the scope of the claims.

I claim:

1. A process of preparing gamma-ethynyl-gamma-valerolactone which comprises reacting 46 parts of sodium with an excess of liquid ammonia in the presence of 1.3 parts of sodium oxide and in the presence of 0.3 part of ferric nitrate enneahydrate, passing acetylene gas into the ammonia solution of sodamide thus prepared at about −50° C. until the gray color thereof changes to black, adding 116 parts of levulinic acid to the sodium acetylide solution thus prepared and isolating the gamma-ethynyl-gamma valerolactone by evaporation of the ammonia, solution in water, acidification, extraction with ether and vacuum distillation.

2. In the process of preparing gamma-ethynyl-gamma-valerolactone, the step which comprises reacting levulinic acid with a solution of an alkali metal acetylide in liquid ammonia.

3. In the process of preparing gamma-ethynyl-gamma lactones, the step which comprises reacting a gamma-keto-carboxylic acid with a solution of an alkali metal acetylide in liquid ammonia.

4. A process which comprises reacting a keto-carboxylic acid in which the ketone and acid groups are separated by a chain of at least one carbon atom with a liquid ammonia solution of an alkali metal acetylide.

5. A process which comprises reacting a keto-carboxylic acid in which the ketone and acid groups are separated by a chain of at least one carbon atom with a solution in liquid ammonia of a compound of the formula $MC{\equiv}CR$ where M is an alkali metal and R is selected from the class consisting of hydrogen and monovalent hydrocarbon radicals.

6. Gamma-ethynyl-gamma-valerolactone.

7. A process which comprises reacting sodium with an excess of liquid ammonia in the presence of sodium oxide and ferric nitrate enneahydrate, passing acetylene gas into the solution until the gray color thereof turns to black, and adding levulinic acid at about −50° C.

8. A process which comprises reacting an alkali metal with an excess of liquid ammonia in the presence of an alkali metal oxide and an ammonia-soluble hydrated salt of a ferrous metal, passing acetylene gas into the solution until the gray color thereof turns to black, and adding levulinic acid at about −50° C.

9. A process which comprises reacting an alkali metal with an excess of liquid ammonia in the presence of an alkali metal and an ammonia-soluble hydrated salt of a ferrous metal, passing acetylene gas into the solution until the gray color thereof turns to black, and adding a gamma-keto-carboxylic acid at about −50° C.

10. A process which comprises reacting an alkali metal with an excess of liquid ammonia in the presence of an alkali metal oxide and an ammonia-soluble hydrated salt of a ferrous metal, passing acetylene gas into the solution until the gray color thereof turns to black, and adding a keto-carboxylic acid in which the ketone and acid groups are separated by a chain of at least one carbon atom.

11. A process which comprises reacting an alkali metal with an excess of liquid ammonia in the presence of an alkali metal oxide and an ammonia-soluble hydrated salt of a ferrous metal, reacting an acetylenic hydrocarbon having at least one acetylenic hydrogen atom with the resulting ammoniacal solution of alkali metal amide, and adding a keto-carboxylic acid in which the ketone and acid groups are separated by a chain of at least one carbon atom.

12. A process which comprises reacting an alkali metal with an excess of liquid ammonia in the presence of an alkali metal and an ammonia-soluble hydrated salt of a ferrous metal, passing acetylene gas into the solution until the gray color thereof turns to black, adding a gamma-keto-carboxylic acid at about −50° C., removing the ammonia and acidifying.

13. A process which comprises reacting an alkali metal with an excess of liquid ammonia in the presence of an alkali metal oxide and an ammonia-soluble hydrated salt of a ferrous metal, passing acetylene gas into the solution until the gray color thereof turns to black, adding a keto-carboxylic acid in which the ketone and acid groups are separated by a chain of at least one carbon atom, removing the ammonia and acidifying.

14. A process which comprises reacting an alkali metal with an excess of liquid ammonia in the presence of an alkali metal oxide and an ammonia-soluble hydrated salt of a ferrous metal, reacting an acetylenic hydrocarbon having at least one acetylenic hydrogen atom with the resulting ammoniacal solution of alkali metal amide, adding a keto-carboxylic acid in which the ketone and acid groups are separated by a chain of at least one carbon atom, removing the ammonia and acidifying.

15. A process which comprises reacting an alkali metal with an excess of liquid ammonia in the presence of an alkali metal and an ammonia-soluble hydrated salt of a ferrous metal, passing acetylene gas into the solution until the gray color thereof turns to black, adding a gamma-keto-carboxylic acid at about −50° C., removing the ammonia and acidifying with a member of the class consisting of strong non-oxidizing mineral acids and acid-reacting inorganic salts.

16. A process which comprises reacting an alkali metal with an excess of liquid ammonia in the presence of an alkali metal oxide and an ammonia-soluble hydrated salt of a ferrous metal, passing acetylene gas into the solution until the gray color thereof turns to black, adding a keto-carboxylic acid in which the ketone and acid groups are separated by a chain of at least one carbon atom, removing the ammonia and acidifying with a member of the class consisting of strong non-oxidizing mineral acids and acid-reacting inorganic salts.

17. A process which comprises reacting an alkali metal with an excess of liquid ammonia in the presence of an alkali metal oxide and an ammonia-soluble hydrated salt of a ferrous metal, reacting an acetylenic hydrocarbon having at least one acetylenic hydrogen atom with the resulting ammoniacal solution of alkali metal amide, adding a keto-carboxylic acid in which the ketone and acid groups are separated by a chain of at least one carbon atom, removing the ammonia and acidifying with a member of the class consisting of strong non-oxidizing mineral acids and acid-reacting inorganic salts.

18. In the process of preparing aliphatic gamma-ethynyl-gammalactones, the step which comprises reacting an aliphatic gamma-keto-carboxylic acid with a solution of an alkali metal acetylide in liquid ammonia.

19. Process which comprises reacting an aliphatic keto-carboxylic acid in which the ketone and acid groups are separated by a chain of at least one carbon atom with a liquid ammonia solution of an alkali metal acetylide.

20. Process which comprises reacting an aliphatic keto-carboxylic acid in which the ketone and acid groups are separated by a chain of at least one carbon atom with a solution in liquid ammonia of a compound of the formula MC≡CR where M is an alkali metal and R is selected from the class consisting of hydrogen and monovalent hydrocarbon radicals.

21. An aliphatic gamma-ethynyl-gamma-lactone.

22. An aliphatic gamma-alkynyl-gamma lactone.

23. A compound of the class consisting of alkynyl hydroxycarboxylic acids of the formula

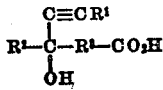

wherein $R^1$ is a member of the class consisting of hydrogen and a monovalent aliphatic hydrocarbon group,
$R^2$ is a monovalent aliphatic hydrocarbon group,
$R^3$ is a divalent aliphatic hydrocarbon group, and lactones of said acids.

24. A lactone of an alkynyl hydroxycarboxylic acid, said lactone having the formula

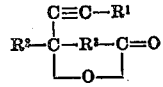

wherein $R^1$ is a member of the class consisting of hydrogen and a monovalent aliphatic hydrocarbon group,
$R^2$ is a monovalent aliphatic hydrocarbon group,
$R^3$ is a divalent aliphatic hydrocarbon radical forming, with the two contiguous carbon atoms, a chain of at least four carbon atoms.

25. A lactone of an alkynyl hydroxycarboxylic acid, said lactone having the formula given in claim 24 wherein $R^1$ is hydrogen.

26. Alkynyl hydroxycarboxylic acids of the formula

wherein $R^1$ is a member of the class consisting of hydrogen and a monovalent aliphatic hydrocarbon group,
$R^2$ is a monovalent aliphatic hydrocarbon group,
and $R^3$ is a divalent aliphatic hydrocarbon group.

27. Alkynyl hydroxycarboxylic acids of the formula given in claim 26 wherein $R^1$ is hydrogen.

OSCAR ROBERT KREIMEIER.